Patented Nov. 26, 1946

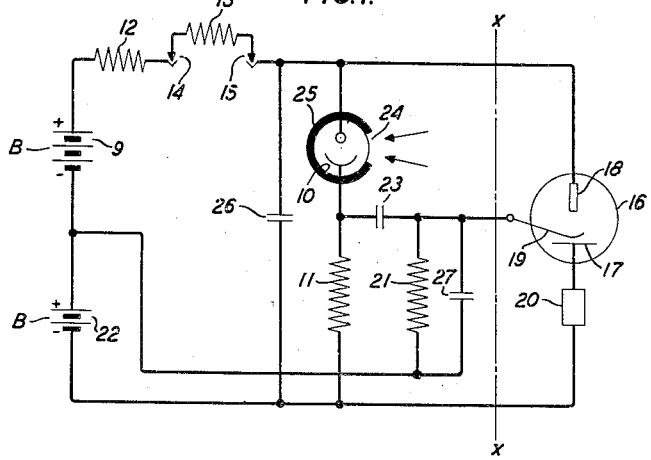
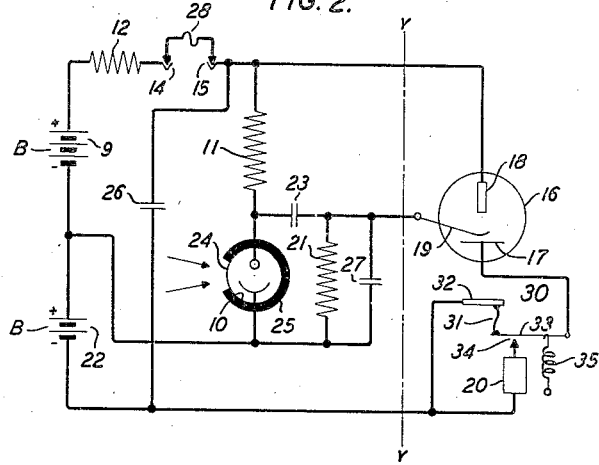

2,411,531

UNITED STATES PATENT OFFICE 2,411,531

ELECTRO-OPTICAL CONTROL SYSTEM

George B. Engelhardt, Hartsdale, N. Y., assignor to Bell Telephone Laboratories, Incorporated, New York, N. Y., a corporation of New York Application October 20, 1944, Serial No. 559,637

11 Claims. (Cl. 250—41.5)

This invention relates to control systems and more particularly to electro-optical control systems.

An object of the invention is to provide an improved system comprising a light sensitive electric device and a gaseous discharge trigger tube.

Another object is to provide an improved control system of the kind employing a gaseous discharge tube.

In an example of practice, a photoelectric cell in series with a first resistor is energized from a battery. A cold cathode gaseous discharge trigger tube having a cathode, a main anode and a control anode is energized from the same battery. The control anode is positively biased by a connection through a second resistor to a tap on the same battery. The terminal of the first resistor, which is connected to the photoelectric cell, is also connected through a condenser to the control anode of the trigger tube. The other terminal of the first resistor is connected to the negative terminal of the battery and through a load device to the cathode of the trigger tube. The load device may be a current operated utility such as a heater element, a lamp or a current operable relay. In this example of practice the main discharge current when the tube fires, is furnished by a relatively large condenser connected between the main anode of the trigger tube and the negative terminal of the battery, the condenser being charged through a resistor of high resistance connected between the positive terminal of the battery and the terminal of the large condenser which is connected to the main anode. The main discharge current of course may be furnished by the battery directly by omitting the large condenser and charging resistor. In order to provide a circuit which is non-responsive to impulsive increases of illumination of the photoelectric cell of short duration, non-responsive to slowly increasing illumination and to decreasing illumination, a third small condenser is connected across said second resistance. This third condenser also improves the reliability of operation of the trigger tube when it fires in response to a desired signal.

In a modified example of practice the positions of the photoelectric cell and first resistor are interchanged so that the cathode of the cell is connected to the negative terminal of the battery and through the load circuit to the cathode to the trigger tube. In this arrangement the circuit is sensitive to desired impulsive decreases of illumination of the photoelectric cell.

In further modified examples of practice, the load circuit of the trigger tube is modified to require two successive impulsive changes in illumination to operate a desired utility. The first impulsive change fires the trigger tube, the main discharge current of which flows through and fuses a fusible link. The fusion of this fusible link effects the completion of a circuit through the desired utility which is then ready to be operated on the second impulsive change of the illumination. It is obvious that any desired number of fusible links may be used ahead of the desired utility to increase the number of successive impulsive changes of illumination which are required to operate such utility.

One specific use for this invention is the detonation of explosive charges when the illumination of the photoelectric cell is impulsively changed in a predetermined manner. Other uses will readily occur to those skilled in the electro-optical art.

This invention will now be described in more detail having reference to the accompanying drawing.

Fig. 1 shows one embodiment of the invention adapted to operate a utility on a single impulsive increase of illumination of the photoelectric cell of desired duration, rate of increase and amount of increase.

Fig. 2 is a modified embodiment adapted to operate a desired utility on a plurality of impulsive decreases of illumination having desired characteristics.

The same reference characters are used to designate identical elements in both figures of the drawing.

Referring now to Fig. 1, a photoelectric cell 10 is connected in series with resistor 11 in a manner to be energized from a battery B, the energizing circuit being completed through resistors 12 and 13, when contactors 14 and 15 are closed. A cold cathode gaseous discharge trigger tube 16 having a cathode 17, a main anode 18 and a control anode 19, is also connected in a manner to be energized from battery B. The main anode 18 is connected through resistors 12 and 13 with the positive terminal of battery B and the cathode 17 is connected through a load device 20 to the negative terminal of battery B. The control anode 19 is connected through a resistor 21 to the positive terminal of section 22 of battery B. This connection places a positive bias on the control electrode 19 and makes possible the firing of trigger tube 16 at a smaller value of control voltage transmitted through condenser 23 which condenser is connected between the upper terminal of resistor 11 and the control anode 19 of trigger tube 16. The photoelectric cell 10 is opaque to light rays except for a window 24, the remainder of the cell container being covered by an opaque coating 25. A condenser 26 is connected from the main anode 18 to the negative terminal of battery B. When the contactors 14 and 15 are closed the condenser 26 is slowly charged through resistors 12 and 13 so that the trigger tube 16 cannot be fired whatever may be the illumination of photoelectric cell 10 until condenser 26 has been fully charged. A condenser 27 is connected in shunt of resistor 21 for the double purpose of making the circuit inoperative for a very rapid increase of illumination of very short duration and more reliable in firing when an impulse of illumination of desired characteristics causes the control gap between control anode 19 and cathode 17 to break down. This circuit is also inoperative for slow increases of illumination of photoelectric cell 10 and for decreases of illumination of any kind.

This circuit is selective of changes of illumination by reason of the cooperation between the condensers 23 and 27 and the resistors 11 and 21. If the illumination is suddenly increased, the upper terminal of resistor 11 becomes more positive. A resulting positive potential is added to the positive bias of control anode 19 but not immediately because of condenser 27 which is gradually charged due to the transfer of charge from condenser 23 through resistor 11 and section 22 of battery B. If the increase of illumination is great enough, rapid enough and sustained for a sufficient length of time, the condenser 27 will be charged to a voltage which, added to the biasing voltage of control anode 19, will fire the trigger tube 16. When the trigger tube fires, the condenser 27 will discharge through the control anode to cathode gap thereby supplying enough transfer current to insure that the discharge will start in the main discharge gap between the main anode 18 and the cathode 17. Most of the main discharge current is supplied by condenser 26 which has previously been fully charged through resistors 12 and 13. If condenser 26 has not been fully charged, the main discharge will not take place. As previously explained herein, all the current may come from the battery if desired but usually a condenser supply is preferable in order to ease the current delivering requirements on the battery.

In order to facilitate an understanding of the invention, the manner of the transfer of charges from condenser 23 to condenser 27 for increases of illumination of the photoelectric cell 10 will now be described. As mentioned hereinbefore, if the illumination is suddenly increased the upper terminal of resistor 11 suddenly becomes more positive with respect to the lower terminal. Since the left-hand and right-hand terminals of condenser 23 are conductively connected through resistor 11, section 22 of battery B and resistor 21, the right-hand terminal of condenser 23 will eventually assume the potential of the lower terminal of resistor 11 increased by the fixed voltage of section 22 of battery B. In order to attain this condition, electrons must flow from the left-hand terminal of condenser 23 to the right-hand terminal such flow taking place upwardly through resistor 21. However, no voltage can be developed across resistor 21 except as condenser 27 becomes charged so that at the very start all the electrons flow into condenser 27 with a gradual increase in the number flowing through resistor 21. If condenser 27 should not be charged sufficiently to fire trigger tube 16, whatever charge there is on condenser 27 will leak off through resistor 21 after the charge on condenser 23 has become stabilized to the then existing illumination on photoelectric cell 10. If the changed illumination is of too short duration, condenser 27 will not become charged to the firing voltage of trigger tube 16. If the increase in illumination is too gradual the condenser 27 will not become charged to the firing voltage of tube 16. If the illumination is decreased, the voltage across condenser 27 has a polarity which opposes the biasing voltage from section 22 of battery B and the trigger tube 16 is not fired. Thus it is seen that a circuit is provided which is sensitive or will fire, only on impulsive increases of light which have a predetermined minimum duration, increase at a rate above some predetermined minimum rate and are greater than some predetermined minimum value.

The illumination of the photoelectric cell 10 is represented by the arrows pointing toward the window 24. This illumination may be produced by natural or artificial sources. It may be changed in any desired manner. For example, the normally covered cell may be uncovered suddenly to daylight causing a sudden increase of illumination or a flashlight may be directed to the uncovered cell at night or in any dark or semi-dark location.

The modified arrangement of Fig. 2 is similar in many ways to that of Fig. 1. The resistor 13 has been replaced by a protective fuse 28. The photoelectric cell 10 and resistor 11 have been interchanged with respect to their coupling to the trigger tube 16 producing a circuit which is responsive to decreases in the illumination of the photoelectric cell 10 because the left-hand terminal of condenser 23 becomes more positive when the illumination is decreased by reason of a decrease in voltage drop across resistor 11. The load circuit for trigger tube 16 has also been changed so that two successive impulsive decreases in illumination are required to operate the desired utility.

This modified load circuit comprises a circuit closer 30 which consists of a fusible link 31 connected between a support 32 and a movable contactor 33, contactor 33 being urged by a spring 35 to close contacts 34. The cathode 17 is connected to contactor 33 and the negative terminal of battery B is connected to support 32 so that when the trigger tube 16 fires the main discharge current passes through the fusible link 31, fusing the link and allowing contactor 33 to close contacts 34 thereby connecting load device 20 in the main discharge circuit of trigger tube 16, ready to be operated on the second reduction of the illumination of photoelectric cell 10. The circuit of Fig. 2 is thus aptly called a two-pulse or multipulse circuit. More than one fusible link device may be inserted between the trigger tube 16 and the load device 20 to increase the number of successive decreases of illumination required to operate the load device.

In order to provide a multipulse circuit operable on increases of illumination the circuit elements to the right of the line Y—Y of Fig. 2 may be substituted for the circuit elements to the right of the line X—X in Fig. 1. Furthermore, in order to provide a single pulse circuit operative on decreases of illumination the circuit elements to the right of line X—X of Fig. 1 may be substituted for the circuit elements to the right of line Y—Y in Fig. 2. The operation of these modified circuit arrangements will be readily understandable from the foregoing explanation of the arrangements of Figs. 1 and 2.

In order to facilitate the practicing of the invention, suitable tubes and values for the circuit elements of Fig. 1 will be given for one embodiment of the invention. It is obvious that other values may be used depending upon the nature of the response desired. Typical tubes and values are as follows:

Photoelectric cell 10—RCA No. 927 photo tube.
Trigger tube 16—W. E. Co. No. 359A gas tube.
Battery B (total)—168 volt dry battery.
Battery B (section 22)—64½ volts.
Resistor 11—35 megohms.
Resistor 12—50,000 ohms.
Resistor 13—2 megohms.
Resistor 21—135 megohms.
Condenser 23—.005 microfarad.
Condenser 26—1.5 microfarads.
Condenser 27—100 micromicrofarads.
Load device 28—2 volt 60 milliampere light bulb or its equivalent power consuming utility.

The term "light" as used herein includes radiations having wave lengths both above and below those of visible light, such as infrared light and ultra-violet light, as well as those of visible light.

This invention may find embodiment in forms other than those described specifically hereinbefore. All such embodiments come within the purview of the appended claims.

What is claimed is:

1. An electro-optical system comprising a gaseous discharge trigger tube having a cathode, a main anode and a control electrode, a source of electricity, a photoelectric cell and a resistor connected in series with each other, said series circuit being connected in a series circuit with said source, means including a condenser for impressing on said control electrode and cathode voltage impulses developed in said series circuit due to impulsive changes of light on said photoelectric cell, another connection between said control electrode and cathode including a second resistor shunted by a second condenser, and a work circuit connected in series with the discharge path between said main anode and said cathode.

2. An electro-optical control system comprising a gaseous discharge trigger tube having a cathode, a main anode and a control anode, a light sensitive electric device, a circuit including a load device, a resistor connected between and in series with said light sensitive electric device and said load device, said series circuit being connected between said main anode and said cathode, a source of potential connected across that portion of said series circuit including said light sensitive electric device and said resistor, a connection through a condenser from said control anode to said series circuit at the junction between said light sensitive electric device and said resistor, and another connection from said control anode to said cathode including a second resistor shunted by a second condenser.

3. An electro-optical control system comprising a gaseous discharge trigger tube having a cathode, a main anode and a control anode, a first resistor, a load circuit, a light sensitive electric device connected between and in series circuit with said first resistor and said load circuit, said series circuit being connected between said main anode and said cathode, a source of potential connected across that portion of said series circuit including said light sensitive electric device and said resistor, a connection through a condenser from said control anode to said series circuit at the junction between said light sensitive electric device and said resistor, and another connection from said control anode to said cathode including a second resistor shunted by a second condenser.

4. An electro-optical control system comprising a gaseous discharge trigger tube having a cathode, a main anode and a control anode, a light sensitive electric device, a load circuit including a load device, a resistor connected between and in series with said light sensitive electric device and said load device, said series circuit being connected between said main anode and said cathode, a source of potential connected across that portion of said series circuit including said light sensitive electric device and said resistor, a connection through a condenser from said control anode to said series circuit at the junction between said light sensitive electric device and said resistor, another connection from said control anode to said cathode including in series relationship a portion of said source of potential and a second resistor, and a second condenser in shunt of said second resistor.

5. An electro-optical control system comprising a gaseous discharge trigger tube having a cathode, a main anode and a control anode, a first resistor, a load circuit, a light sensitive device connected between and in series circuit with said load circuit and said first resistor, said series circuit being connected between said main anode and said cathode, a source of potential connected across that portion of said series circuit including said light sensitive electric device and said resistor, a connection through a condenser from said control anode to said series circuit at the junction between said light sensitive electric device and said resistor, another connection from said control anode to said cathode including in series relationship a portion of said source of potential and a second resistor, and a second condenser in shunt of said second resistor.

6. An electro-optical control system comprising a gaseous discharge trigger tube having a cathode, a main anode and a control electrode, a source of electricity, a photoelectric cell and a resistor connected in series with each other, said series circuit being connected in a series circuit with said source, means including a condenser for impressing on said control electrode and cathode voltage impulses developed in said series circuit due to impulsive changes of light on said photoelectric cell, another connection between said control electrode and cathode including a second resistor shunted by a second condenser, and a work circuit connected in series with the discharge path between said main anode and said cathode, said work circuit including a fusible link and means connecting a load device in series with the discharge path between said main anode and cathode when said link is fused.

7. An electro-optical control system comprising a source of direct current, a first resistor having one terminal connected to the positive terminal of said source, a first condenser connected between the other terminal of said first resistor and the negative terminal of said source, a photoelectric cell and a second resistor connected in series, said series circuit being connected across said first condenser, a gaseous discharge trigger tube comprising a cold cathode, a main anode and a control anode, a load device connected in series with the discharge path between said main anode and said cathode, said last-mentioned series circuit being connected across said first condenser, a second condenser connected between said control anode and the junction between said photoelectric cell and said second resistor, a third resistor connected between said control anode and an intermediate tap on said source, and a third condenser connected in shunt of said third resistor.

8. An electro-optical control system comprising a source of direct current, a first resistor having one terminal connected to the positive terminal of said source, a first condenser connected between the other terminal of said first resistor and the negative terminal of said source, a photoelectric cell and a second resistor connected in series, said series circuit being connected across said first condenser, a gaseous discharge trigger tube comprising a cold cathode, a main anode and a control anode, a fusible link connected in series with the discharge path between said main anode and said cathode, said last-mentioned series circuit being connected across said first condenser, a second condenser connected between said control anode and the junction between said photoelectric cell and said second resistor, a third resistor connected between said control anode and an intermediate tap on said source, a third condenser connected in shunt of said third resistor, and means connecting a current energized utility in series with the discharge path between said main anode and cathode when said link is fused.

9. The method of firing a gaseous discharge trigger tube in response to a change in a controlling condition which comprises impulsively changing said controlling condition, changing a condenser charge as the result of said changing condition, utilizing current produced as a result of said changing condenser charge to build up a second condenser charge, and firing said trigger tube when said second condenser charge has built up a desired amount.

10. The method of producing a delayed response to a control impulse in a gaseous discharge tube circuit which comprises changing a voltage which is adapted to produce a change of condenser charge in response to a control impulse, utilizing said change of charge at least in part to build up a second condenser charge, and utilizing the voltage of said second condenser charge after the charge has built up a desired amount to fire the gaseous discharge tube.

11. The method of producing a delayed response in a gaseous discharge tube circuit which comprises charging a condenser to an operating voltage in accordance with a condition of illumination, applying a voltage to the tube in a direction to cause breakdown which is below the tube breakdown voltage, changing the condition of the illumination to change the charge on the condenser progressively to produce a progressively increasing voltage, adding the progressively increasing voltage to the voltage applied to the tube, and operating the tube when the sum of the voltages reaches an amount corresponding to the breakdown voltage of the tube.

GEORGE B. ENGELHARDT.